United States Patent [19]

Furuya et al.

[11] Patent Number: 5,550,742

[45] Date of Patent: Aug. 27, 1996

[54] SCHEDULED MOTION PLANNING METHOD AND APPARATUS FOR A VEHICLE

[75] Inventors: Masatoshi Furuya; Toshiro Sasaki; Fuminobu Komura, all of Yokohama, Japan

[73] Assignee: Hitachi, Ltd., Tokyo, Japan

[21] Appl. No.: 274,282

[22] Filed: Jul. 13, 1994

[30] Foreign Application Priority Data

Jul. 14, 1993 [JP] Japan ................................. 5-173975

[51] Int. Cl.⁶ ........................................... G06F 165/00
[52] U.S. Cl. ..................... 364/449; 244/161; 364/424.01
[58] Field of Search ...................... 364/424.01, 424.02, 364/578, 449, 460; 244/160, 161; 348/117

[56] References Cited

U.S. PATENT DOCUMENTS 5,038,290  8/1991  Minami ................................. 364/436
5,411,227  5/1995  Basuthakur et al. ................. 244/169
5,436,841  7/1995  Ferro .................................... 364/459

*Primary Examiner*—Michael Zanelli
*Attorney, Agent, or Firm*—Antonelli, Terry, Stout & Kraus

[57] ABSTRACT

A scheduled motion plan for a vehicle which satisfies constraints and demanded specifications in consideration of the performance of the control system on condition that the control system which is conventionally used is used is made. To guide and control the motion of the vehicle on the basis of the plan, an apparatus for planning the motion of the vehicle has an onboard simulator containing a dynamic model and guidance and control model, a simulation condition setting unit for setting simulation conditions of the onboard simulator, an analyzer for evaluating a simulation result by the onboard simulator, and a scheduler for making a motion plan. The apparatus sets an ideal velocity at a position on the basis of constraints and demanded specifications, compares it with a position, a velocity, or the simulation result, judges a plan type, and sets the simulation conditions 180 for the plan type.

16 Claims, 12 Drawing Sheets

SCHEDULED MOTION PLANNING METHOD AND APPARATUS FOR A VEHICLE

BACKGROUND OF THE INVENTION

The present invention relates to a scheduled motion planning method and apparatus for a vehicle and more particularly to a scheduled motion planning method and apparatus suited to a rendezvous and docking of a space vehicle.

Phase plane control (hereinafter called Prior Art 1) is one of the orbit control methods for space vehicles which are used conventionally by operators of space vehicles or control system designers.

FIG. 5 shows characteristics of phase plane control which are displayed on a phase plane. This control is independent in the three axes of x, y, and z. In FIG. 5, the horizontal axis represents a position deviation 401 between the desired position and position data and the vertical axis represents a velocity deviation 402 between the desired velocity and velocity data. In a + (plus) region 403 shown in the drawing, a control command is issued to a space vehicle so as to accelerate in the + (plus) direction. In a − (minus) region 404, the control command is issued to a space vehicle so as to accelerate in the (minus) direction. In a 0 (zero) region 405 (dead band), the control command is 0. The 0 region 405 is generally designed to be sufficiently wide compared with measurement errors of the position data and velocity data.

FIGS. 6 and 7 show response examples under the phase plane control.

In FIG. 6, the horizontal axis represents time and the vertical axis represents velocity. In the drawing, a desired velocity 411, an actual velocity 412, and a velocity 413 inputted to the controller (data measured by the sensor which is filtered) are shown. Although the actual velocity 412 overshoots the desired velocity 411, it is robustly stable for the measurement error.

FIG. 7 shows a locus 414 on the phase plane at this time (locus of the relationship between the position deviation and velocity deviation which are inputted to the controller).

As one of the means for suppressing overshooting, a method for presetting a temporary desired value and switching the desired value in appropriate timing (hereinafter called Prior Art 2) is proposed in Japanese Patent Application Laid-Open No. Heisei 5-127701.

The temporary desired value is designed so that the peak value when the actual velocity overshoots the desired velocity becomes equal to the original desired value and when the actually controlled value reaches the original desired value, the desired value is switched. This method does not preset the switching timing.

As one of other control methods, a method using predictive fuzzy control (hereinafter called Prior Art 3) is proposed in Journal of Japan Society for Aeronautical and Space Sciences, Vol. 39, No. 444, p 44 to 50, 1991.

In this method, a control command is decided by fuzzy inference of an evaluation function for three types of velocities when the velocity of a space vehicle is changed from the present velocity by ± delta and when it is left unchanged. In this case, by using an example of orbit control in the final approach phase of rendezvous and docking of the space vehicle, the magnitude of relative distance, upper and lower velocity limits, arrival time, and avoidance of collision (safety) are selected as evaluation items.

Rendezvous and docking of a space vehicle is generally divided into several phases depending on the flying method. For example, there are phases of orbit input, transfer, fly-around, final approach, and docking available. It is desirable in this case to make a scheduled motion plan from start to end for at least one phase and to let an operator know the scheduled motion plan. By doing this, the operator can predict the safety to a certain extent.

It is necessary that the scheduled motion plan itself can be changed depending on the status. By doing this, a disturbance, failure, or abnormal phenomenon can be properly dealt with.

Furthermore, an attempt to control the evaluation items precisely one by one like Prior Art 3 is also a method. However, it may be considered to use the control system like Prior Art 1 which is conventionally used by users and control system designers and to make a scheduled motion plan so as to put the characteristics of the control system to practical use. For example, under the aforementioned phase plane control, it is known that overshooting can be improved by setting the desired velocity in stages like Prior Art 2.

SUMMARY OF THE INVENTION

An object of the present invention is to provide a method for making a scheduled motion plan which satisfies the evaluation items under constraints and demanded specifications in consideration of the performance of the control system on condition that the control system which is conventionally used by users and control system designers is used and more particularly a scheduled motion plan when phase plane control is used as the above control system and an apparatus using the method.

To accomplish the above object, the scheduled motion planning apparatus for a vehicle of the present invention has a motion simulator for a vehicle (hereinafter called an onboard simulator) including a dynamic model and guidance and control model for predicting the motion of the vehicle, a means for setting simulation conditions necessary for the onboard simulator, an onboard simulator for simulating using a dynamics model and guidance and control model, a means for evaluating the simulation result, and a means for making a scheduled motion plan on the basis of the evaluation result.

Input data to the apparatus is the position to the time, velocity data, constraints, and demanded specifications.

The scheduled motion planning method for a vehicle of the present invention consists of a step for deciding an ideal position and velocity data for satisfying predetermined constraints and demanded specifications, comparing them with the actual position and velocity data, deciding a plan type, and setting simulation conditions, a step for simulating using a dynamics model and guidance and control model on the basis of the set simulation conditions, a step for outputting the simulation result, a step for evaluating the simulation result, and processing for making a scheduled motion plan on the basis of the evaluation result.

According to the aforementioned means or processing, the motion is predicted including the control model, so that even if the performance of the control system may include overshooting, undershooting, response delay, or stationary deviation, constraints and demanded specifications can be satisfied.

As a control system, a one which is conventionally used is used, so that uneasiness of an operator to robust stability can be reduced.

The scheduled motion plan can be notified an operator of a vehicle, so that the operator can predict the safety to a certain extent.

EMBODIMENT

Next, by using the scheduled motion plan under orbit control in the final approach phase of rendezvous and docking of a space vehicle as an actual application example, the scheduled motion planning method and apparatus of the present invention will be explained.

Figure 1:
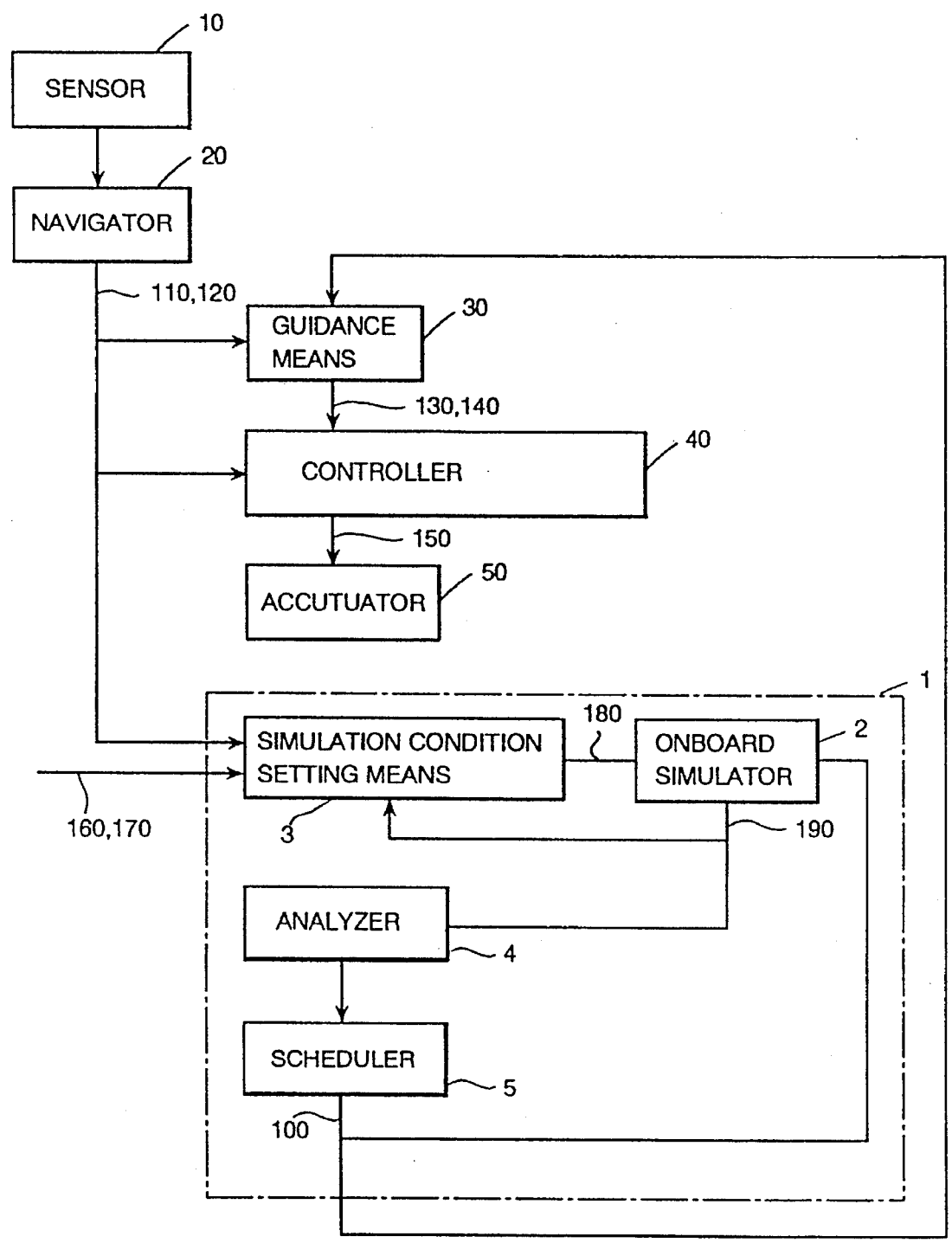
FIG. 1 is a block diagram of a vehicle guidance and control system including the scheduled motion planning apparatus of the present invention.

FIG. 1 shows a system configuration consisting of an apparatus which is indispensable to obtain data of a vehicle and to accelerate or decelerate the vehicle and a scheduled motion planning apparatus.

A navigator 20 calculates a position 110 and a velocity 120 of the vehicle on the basis of the measured data of a sensor 10. The navigator 20 contains a filter and image processor.

A guidance means 30 calculates a desired position 130 of the vehicle and a desired velocity 140 of the vehicle on the basis of motion plan 100, the position 110 of the vehicle, and the velocity 120 of the vehicle.

A controller 40 decides a control command 150 and operates an actuator 50 on the basis of the motion plan 100, the position 110 of the vehicle, the velocity 120 of the vehicle, the desired position 130 of the vehicle, and the desired velocity 140 of the vehicle.

A motion planner for vehicle 1 consists of a motion simulator (hereinafter called an onboard simulator 2) of the vehicle, a simulation condition setting means 3 for setting simulation conditions 180 of the onboard simulator, an analyzer 4 for evaluating a simulation result 190, and a scheduler 5 for making the motion plan 100.

The simulation condition setting means 3 sets the simulation conditions 180 on the basis of the position 110 of the vehicle, the velocity 120 of the vehicle, constraints 160, and demanded specifications 170. In this case, the constraints and demanded specifications are given by a separate means. For example, they are read from an onboard database of the vehicle or given by an operator 60. The simulation conditions include not only the initial state of motion of the vehicle but also the integral method and states to be predicted (time, deviation, position, velocity, used fuel amount, etc.). The state amount (simulation result 190) which is calculated by the onboard simulator may be used as an initial state.

The onboard simulator 2 contains a dynamics model and guidance and control model of the vehicle, simulates the motion of the vehicle on the basis of the simulation conditions 180, and outputs the simulation result 190.

The analyzer 4 evaluates whether the simulation result 190 satisfies the constraints 160 and the demanded specifications 170.

The scheduler 5 makes the motion plan 100 on the basis of the evaluation of the simulation result, formats it so that the guidance means 30 and the controller 40 can understand it, and sends it to them. The motion plan 100 may be sent to the operator 60.

The navigator 20, the guidance means 30, the controller 40, and the motion planner for vehicle 1 are onboard computers. These apparatuses have a means for knowing a time 220. For example, each apparatus has a synchronized clock or information of time is transferred to each apparatus from an apparatus (the navigator 20 is desirable). In this case, the cycle for outputting new scheduled motion planning from the motion planner for vehicle may be larger than the processing cycle of each apparatus.

For example, when the guidance means and controller calculate the desired position, desired velocity, and control command every 100 ms, the motion planner for vehicle may update the scheduled motion planning every 10 seconds.

Furthermore, when information requiring emergency is given by the operator 60 or another means, the motion planner for vehicle 1 may update the scheduled motion planning regardless of periodic updating.

If the velocity at a certain time can be regarded as a stationary state when the state amount is to be obtained in the onboard simulator 2, the state amount at an optional time is calculated on the basis of the state at that time without recursive integral being performed. In other cases, recursive integral is performed using the physical cycle of the controller 40 as an integral step size.

The scheduled motion planning method for orbit control in the final approach phase of rendezvous and docking of a space vehicle will be explained hereunder as an actual application example of the present invention.

Figure 2:
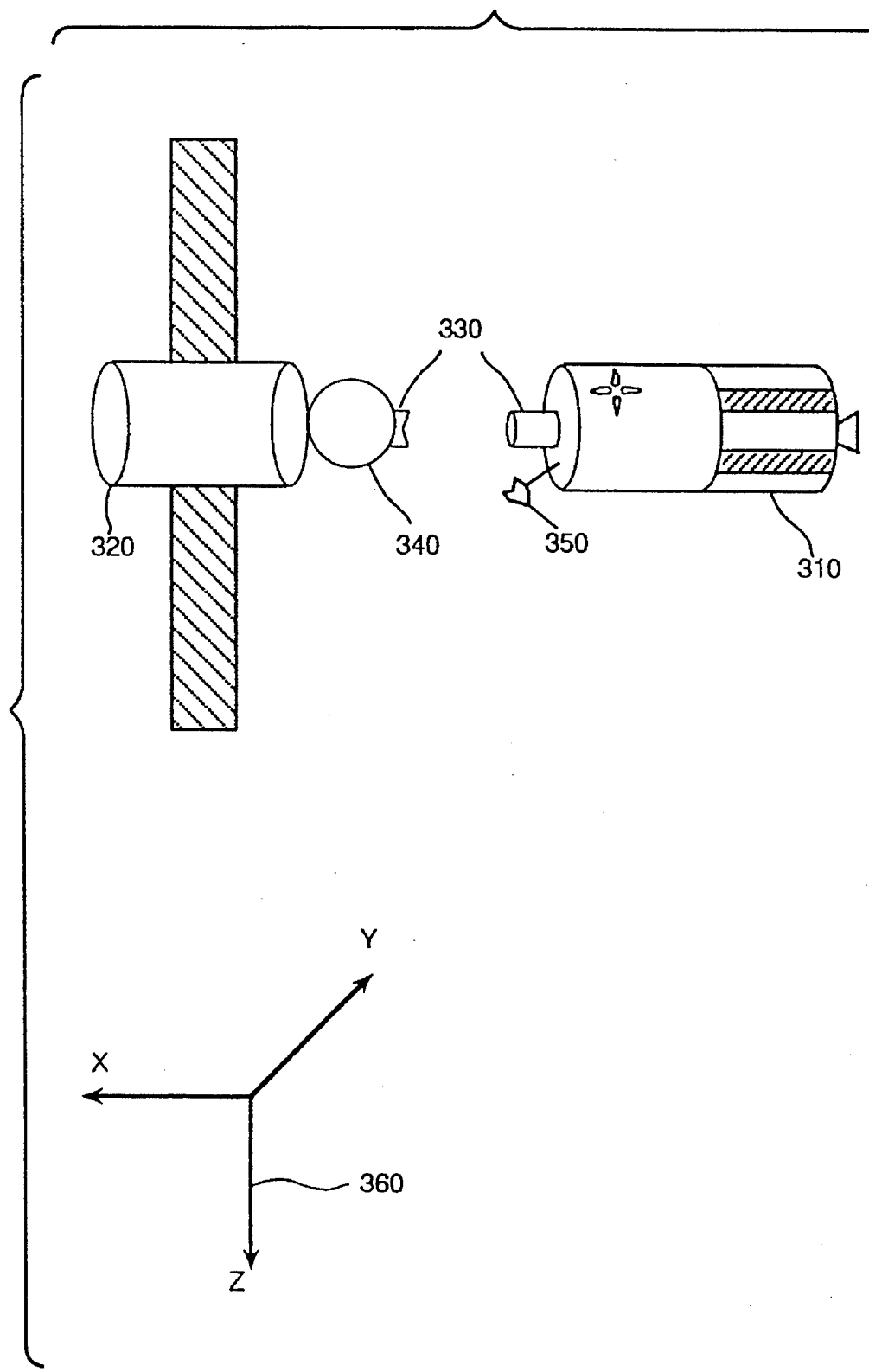
FIG. 2 is a schematic diagram of a space vehicle which performs rendezvous and docking relating to an embodiment of the present invention.

FIG. 2 is a schematic diagram of a chaser spacecraft 310 and a target space-craft 320 for performing rendezvous and docking.

Rendezvous and docking of a space vehicle is a technology necessary for periodic inspection and repair of a target space-craft by a chaser spacecraft, material supply to the target space-craft, and collection of products from the target space-craft. A docking port 330 is installed to the chaser space-craft 310 and the target space-craft 320 respectively so that the two space-crafts can dock with each other. When they are docked, various services are executed. A reflector 340 or target marker is generally mounted to the target space-craft. By taking an image of it by a video camera 350 of the chaser space-craft, the relative position of both space-crafts can be measured.

In the final approach phase of rendezvous and docking, the docking axes (hereinafter called relative coordinates 360) of the target space-craft are used as coordinates. The x axis represents the nose direction of the target space-craft, the y axis represents the right direction of the target space-craft, and the z axis represents the floor direction of the target space-craft.

Figure 3:
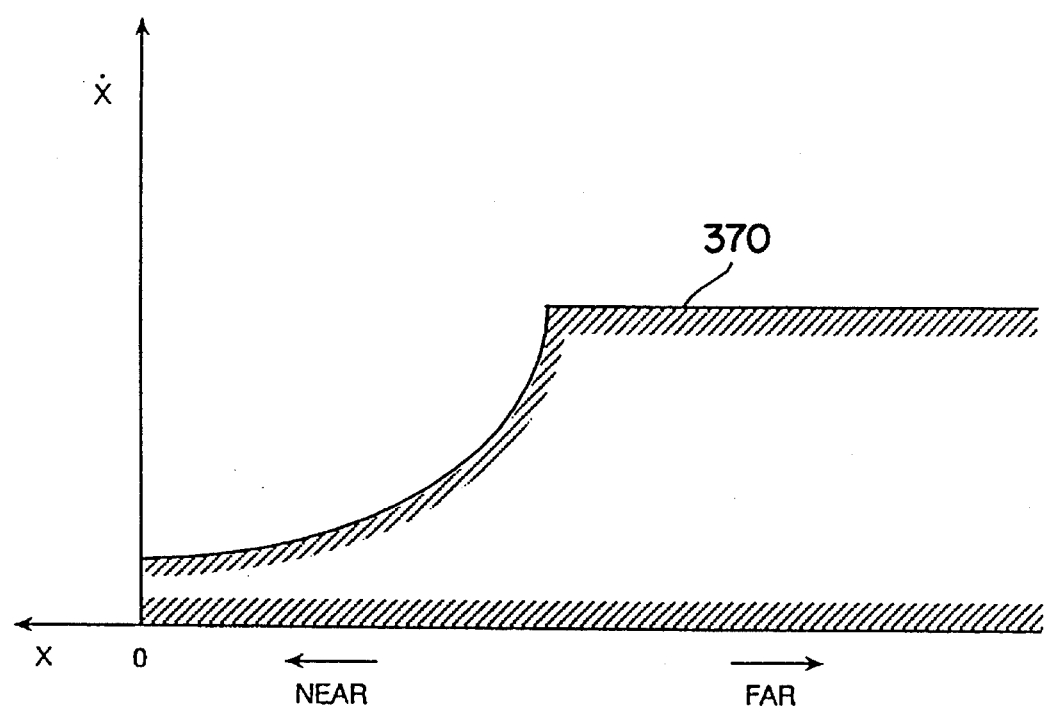
FIG. 3 is a drawing for explaining an embodiment of the present invention.

FIG. 3 shows an example of constraints of the approach velocity in the final approach phase.

In the final approach phase, the user or operator sets constraints 370 of the approach velocity in the x axial direction. The constraints may be calculated by another means mounted in the space-craft. FIG. 3 shows an example of constraints of the approach velocity to the relative position. The example shows that as the relative distance decreases, the approach velocity decreases.

Figure 4:
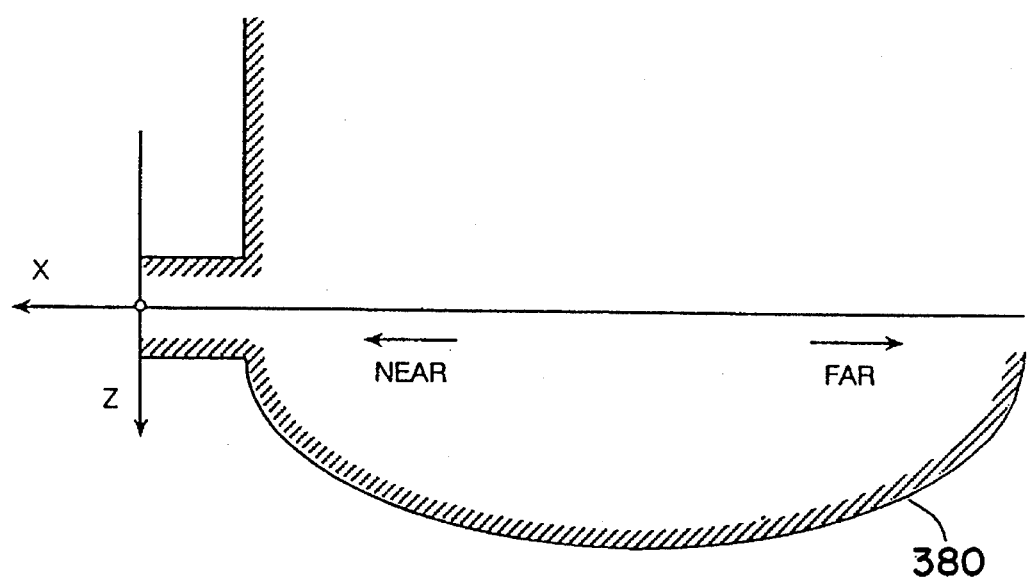
FIG. 4 is a drawing for explaining an embodiment of the present invention.

FIG. 4 shows an example of constraints of the position in the final approach phase.

In the final approach phase, the user or operator sets constraints 380 of the approach region. This limit may be calculated by another means mounted in the space-craft. FIG. 4 shows an example of constraints of the z axial position to the x axial position. The margin of short distance of the docking mechanism of the two space-crafts and the long distance approach limit which is decided by the arrival time given by the demanded specifications are shown.

Figure 5:
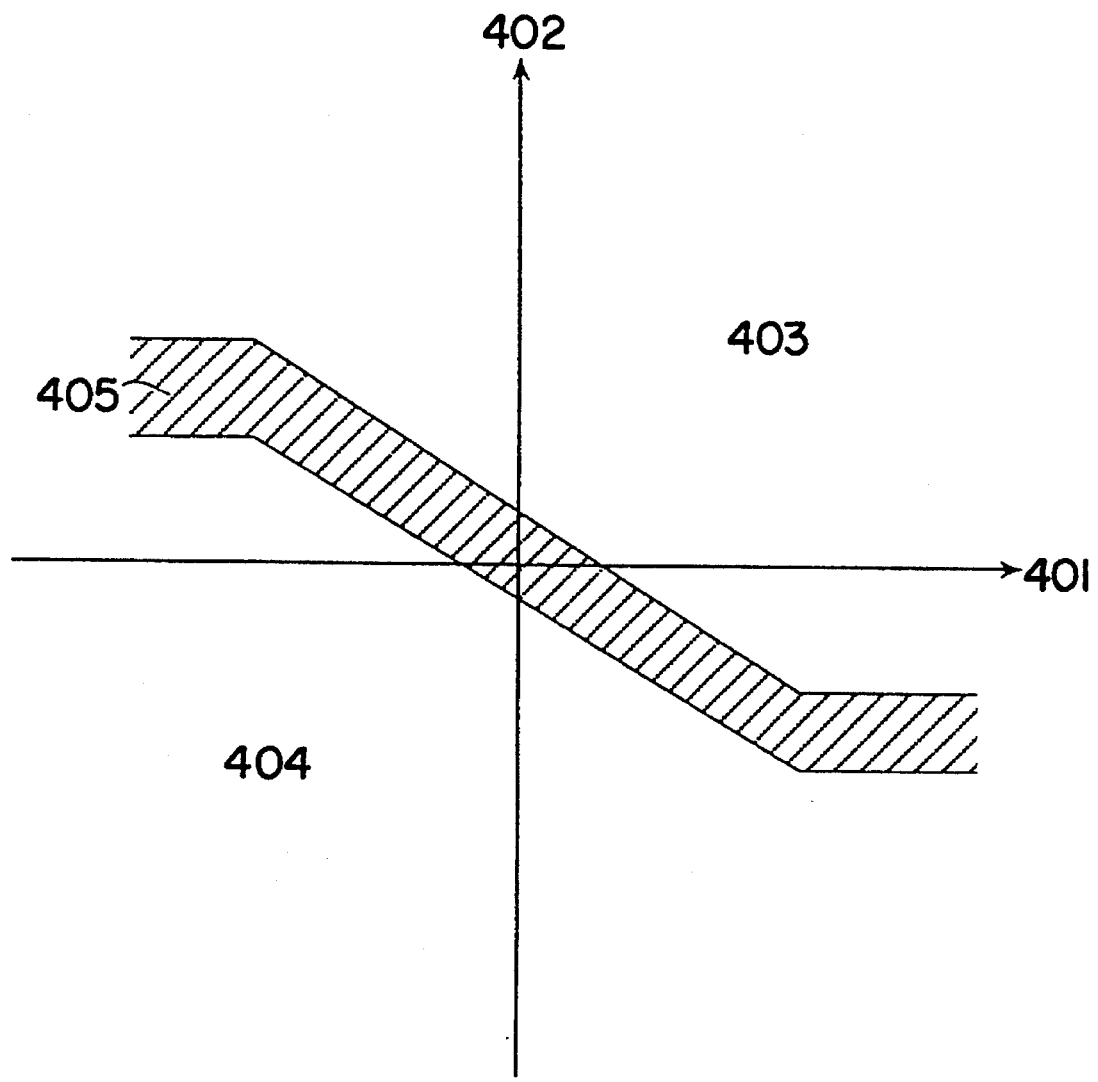
FIG. 5 is a drawing for explaining phase plane control which is one of the controls which is used for scheduled motion planning of the present invention.
Figure 6:
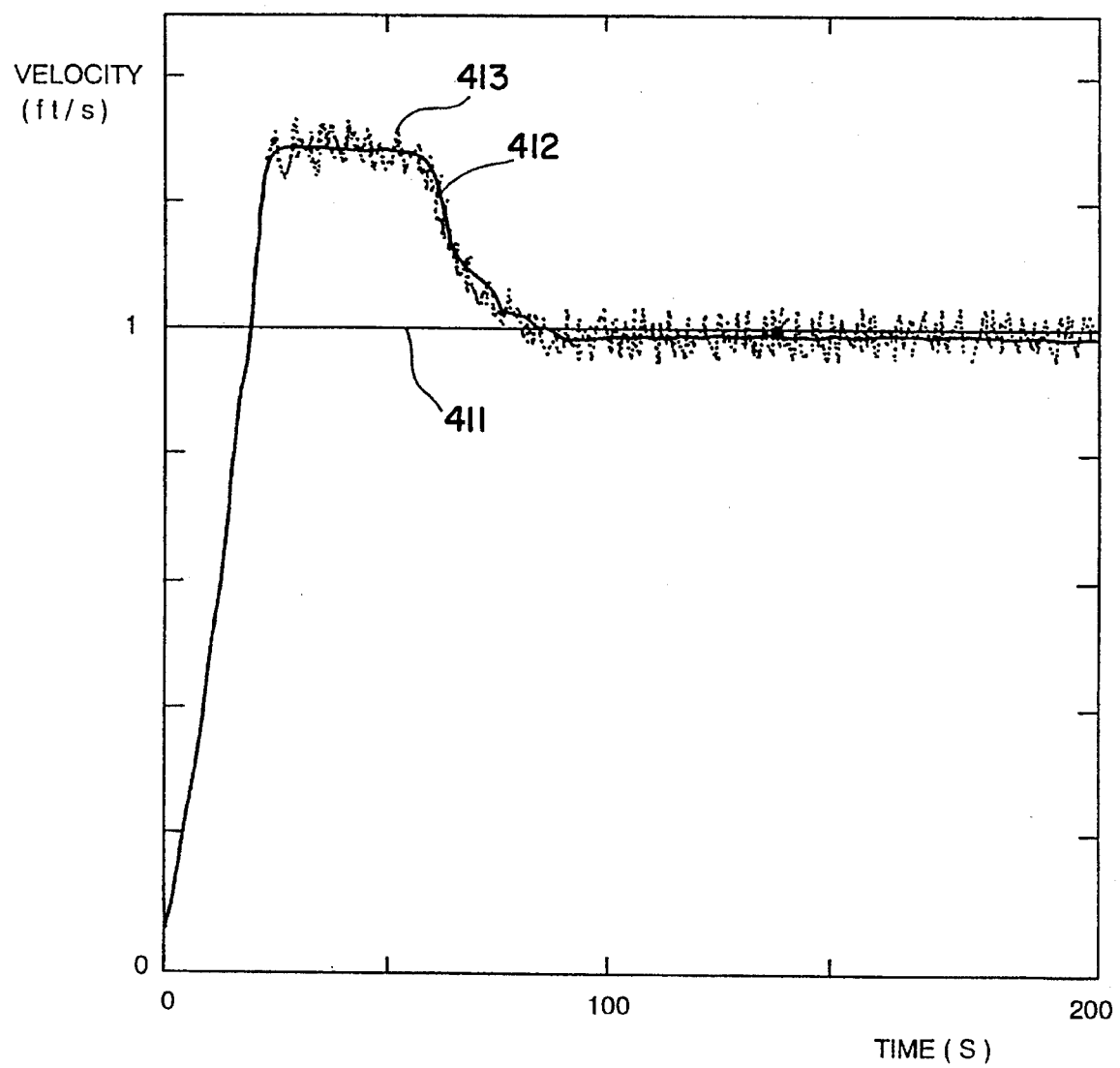
FIG. 6 is a drawing for explaining a response example under phase plane control.
Figure 7:
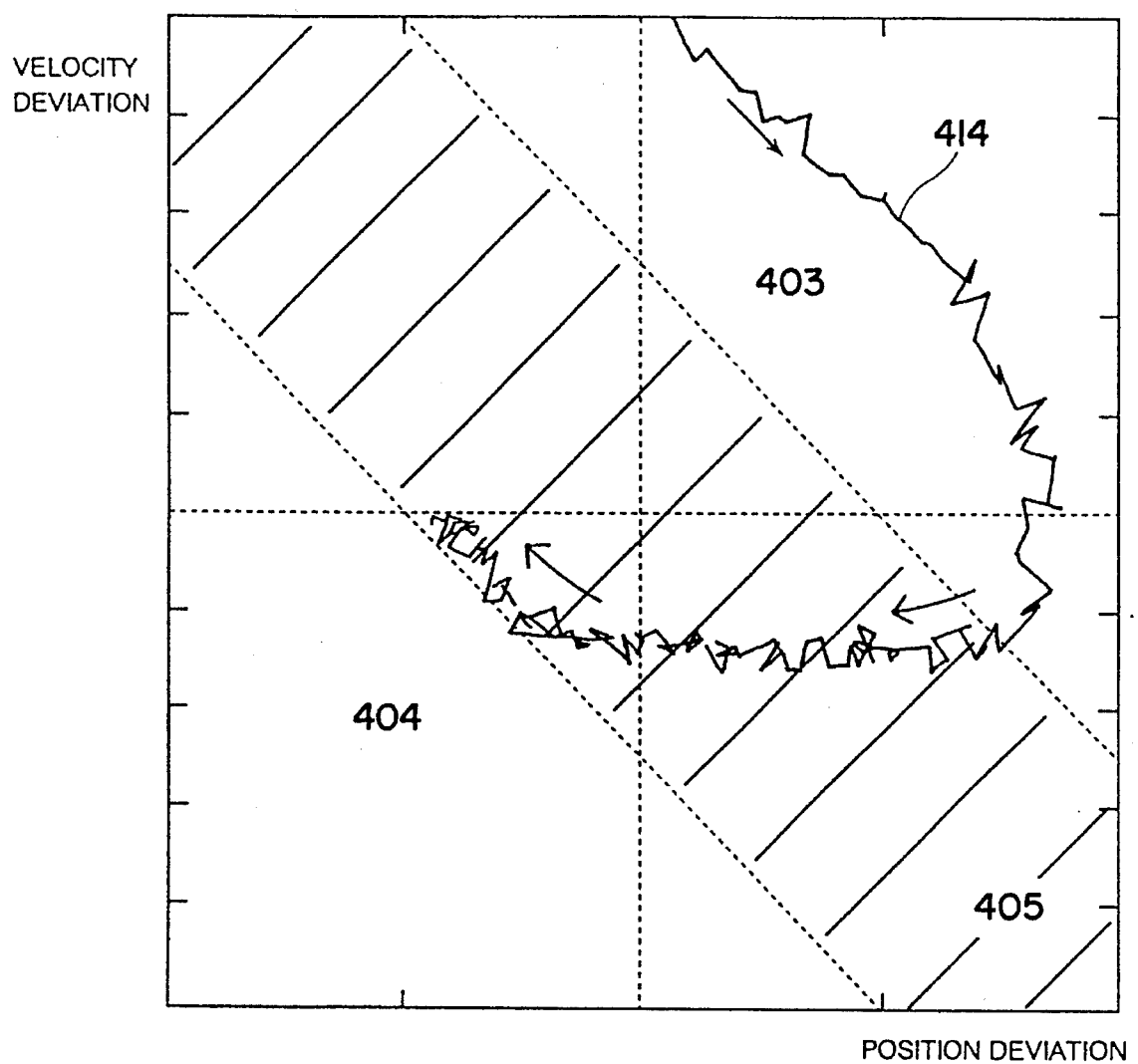
FIG. 7 is a drawing for explaining a response example under phase plane control.

FIG. 5 shows characteristics of the phase plane control, which is conventionally used as an orbit control method for a space-craft, on a phase plane.

This control is represented by a phase plane as shown in FIG. 5 independently in the x, y, and z axial directions. In FIG. 5, the horizontal axis represents a position deviation 401 between a desired position 130 and position data 110 and the vertical axis represents a velocity deviation 402 between a desired velocity 140 and velocity data 120. In a + 0 region 403 shown in the drawing, a control command 150 is issued to a space vehicle so as to accelerate in the + direction. In a − region 404, the control command is issued to a space vehicle so as to accelerate in the - direction. In a 0 region 405 (dead band), the control command is 0. The 0 region is generally designed to be sufficiently wide for measurement errors of the position data and velocity data. In the explanation of the present invention, the boundary between the + region and 0 region is called a + boundary and the boundary between the − region and 0 region is called a − boundary.

Figure 8:
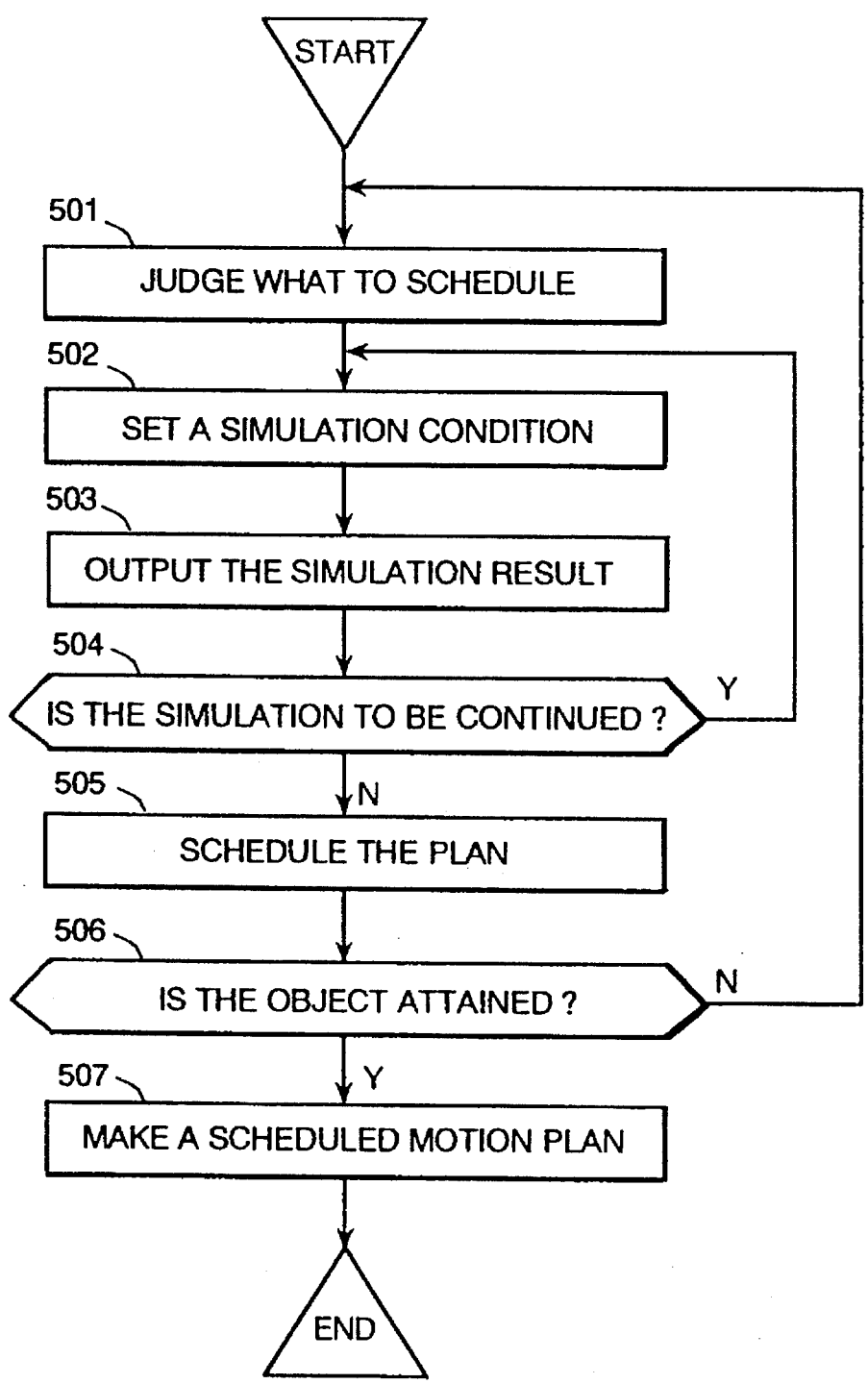
FIG. 8 is a flow chart for explaining the processing procedure of the scheduled motion plan of the present invention.

Next, the procedure for making an actual scheduled motion plan will be explained with reference to the flow chart shown in FIG. 8.

Firstly, the plan type is judged from the position 110 and the velocity 120 of the space-craft on the basis of the constraints 160 and the demanded specifications 170 (demands for safety, time, and fuel cost and mission goal) (Step 501). For example, when the position data in the x axial direction which is obtained from the navigator 20 is about −1000 ft and the velocity data is about 0 ft/s, the plan type is acceleration up to 1 ft/s demanded specifications.

Next, for the plan type which is judged at Step 501, a necessary simulation condition 180 is set (Step 502). In the above example, the initial state and ideal velocity are given as a simulation condition.

Next, for the simulation condition 180 which is set at Step 502, the onboard simulator 2 outputs the simulation result 190 (Step 503). In the above example, the onboard simulator 2 calculates the intermediate desired velocity when the actual peak velocity becomes about 1 ft/s by repeating simulation and the state after a certain time elapses.

Next, for the plan type which is judged at Step 501, whether or not to continue the simulation is judged. When the simulation is to be continued, the processing is returned to Step 502. When the simulation is not to be continued, the processing goes to Step 505 (Step 504). In the above example, the processing is returned to Step 502.

When the processing is returned to Step 502 from Step 504, the next simulation condition 180 is set on the basis of the simulation result 190 at Step 503 (Step 502). In the above example, the position on the phase plane which is suited to switch the desired velocity from the intermediate desired velocity to the ideal velocity and the state due to simulation as an initial state after a certain time elapses are given.

Next, for the simulation condition 180, the onboard simulator 2 outputs the simulation result 190 once again (Step 503). In the above example, the onboard simulator calculates the time until arrival at an appropriate point on the phase plane and the time until arrival at stationary state and its state.

Furthermore, when a scheduled motion plan until mission goal is achieved is to be made, the processing is returned to Step 501 and continued.

For example, when the position data in the x axial direction is calculated to about −900 ft and the velocity data is calculated to about 1 ft/s according to the simulation result 100 seconds later in the processing up to now, a plan type for decelerating from 1 ft/s to 0.5 ft/s at about −500 ft is judged at Step 501 and the processing from Step 502 to Step 504 is repeated once again.

When the processing mentioned above ends, the scheduled motion plan is made.

Next, rules for processing of the simulation condition setting section will be explained concretely.

(1) Rule for setting the ideal velocity for approach, several ideal velocities (1, 0.5, 0.2, etc.) are set and a range for requiring these ideal velocities (from −1000 to −500 ft, from −500 to −100 ft, etc.) is set from the scheduled time for arrival at the final desired position, safety, and fuel cost. For separation, the ideal velocity is set to a negative value.

(2) Rule for deciding the plan type

When the velocity (it may be data from the navigator or the simulation result by the onboard simulator) to the position is considerably smaller than the ideal velocity, the plan type is decided to accelerate the velocity to the ideal velocity.

When the velocity to the position is considerably larger than the ideal velocity, the plan type is decided to decelerate the velocity to the ideal velocity.

When the velocity to the position is almost equal to the ideal velocity, a plan for the next ideal velocity is made.

When the position is almost equal to the constraint limit in the approach region, a plan for changing the control mode is made.

When a matter of emergency (particularly a problem of safety) occurs, a plan (for example, station keeping, back away) for dealing with the matter is made.

(3) Rule for planning

Figure 9:
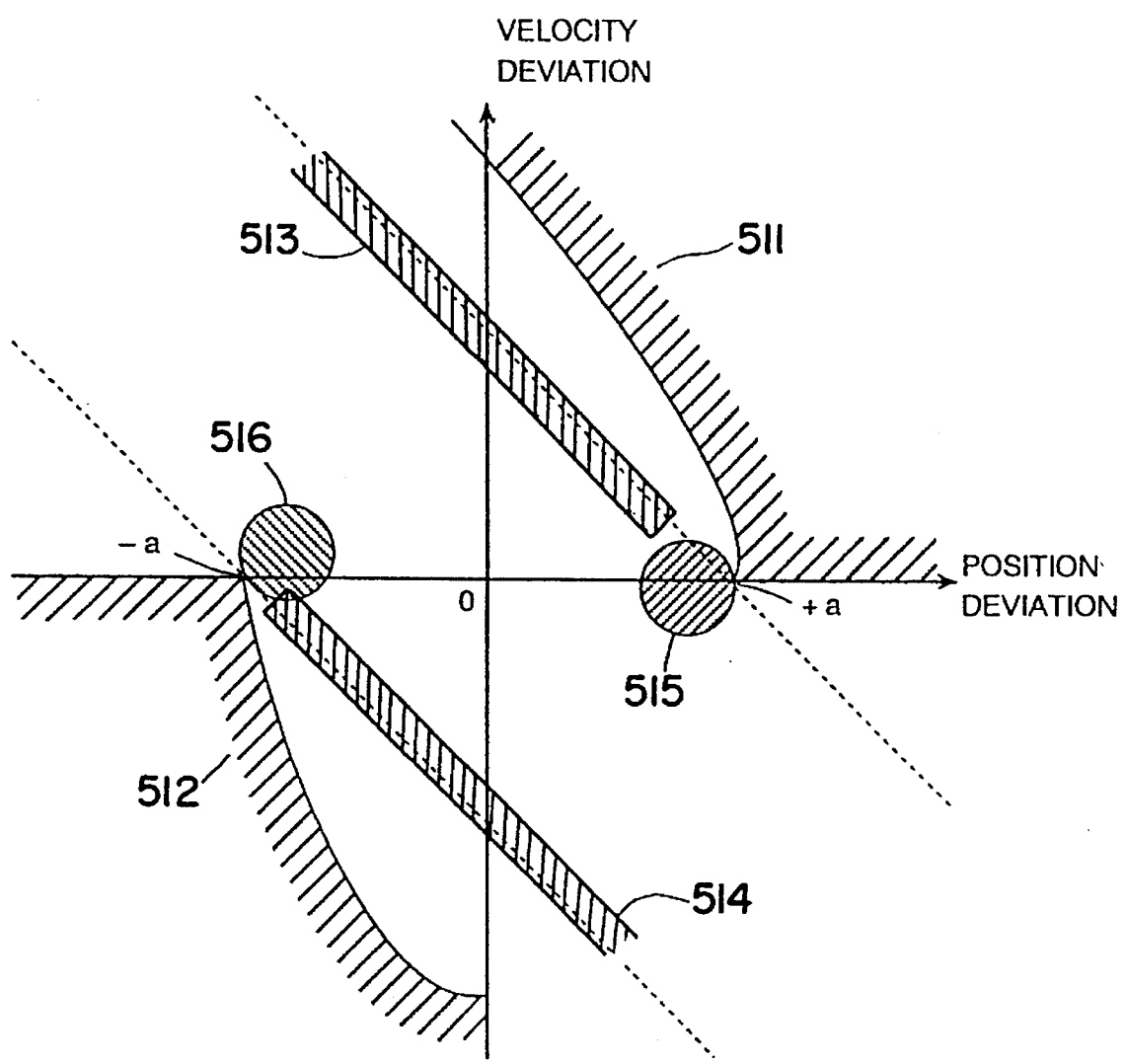
FIG. 9 is a drawing for explaining a characteristic region under phase plane control.

The rule will be explained with reference to FIG. 9.

When acceleration up or deceleration down to the ideal velocity may enter an overshoot region 511 or an undershoot region 512 on the phase plane, an intermediate desired velocity so that the peak velocity reaches the ideal velocity is calculated and the timing for switching the intermediate desired velocity is that the position deviation and velocity deviation may reach a + binding border region 513 or a − binding border region 514 on the phase plane immediately after switching.

When it can be predicted that acceleration up or deceleration down to the ideal velocity will not be overshot or undershot by analysis on the phase plane, the desired velocity is considered as an ideal velocity.

When the next ideal velocity is to be decelerated, the time up to + or − binding region 515 or 516 is calculated and the desired velocity switching time is adjusted so that the predicted velocity will not exceed the ideal velocity to the position in consideration of the time.

If the control mode is to be switched, the switching time must be set so that the position deviation and velocity deviation are in the 0 region on the phase plane and the desired position at the time of switching must be the position which is measured at that time.

The aforementioned rules are the basic rules for making a scheduled motion plan.

Examples of the scheduled motion plan made according to these rules will be explained with reference to FIGS. 10, 11, and 12. Desired values 522 and 532 shown in FIGS. 10 and 11 are obtained by the guidance means 30 according to the motion plan 100.

Figure 10:
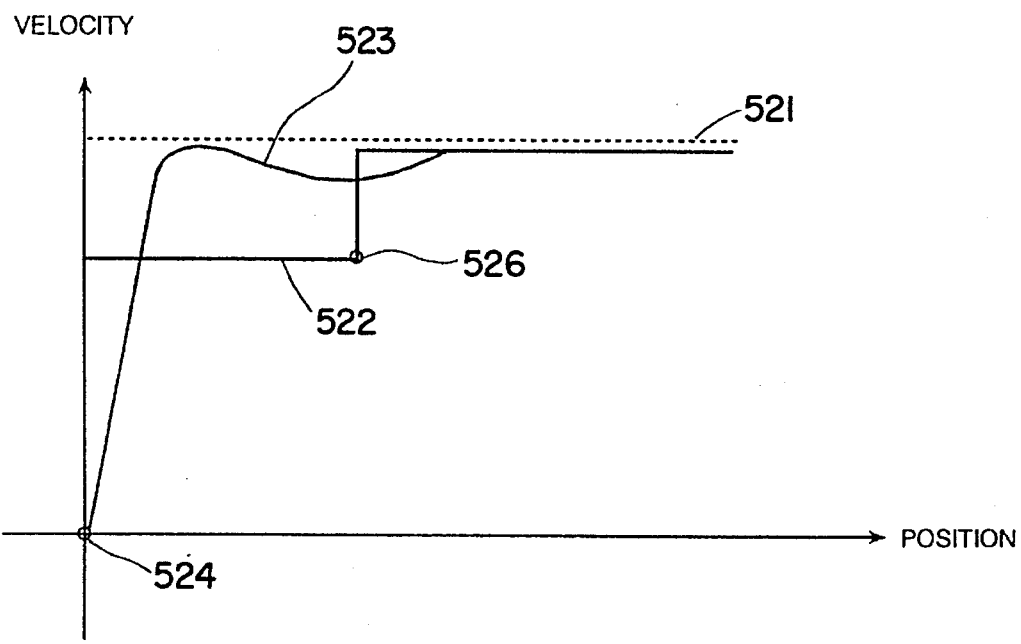
FIG. 10 is a drawing showing an example of a scheduled motion plan by the scheduled motion planning method of the present invention.

FIG. 10 shows the relationship of the velocity (the vertical axis) to the position (the horizontal axis). Since the velocity at the time of planning 524 is substantially smaller than an ideal velocity 521, an example that acceleration to the ideal velocity is planned is shown. In this case, the motion planner for vehicle 1 makes a plan related to intermediate desired velocity and switching timing 526 by analyzing on the phase plane. A predicted velocity 523 is considerably close to the ideal velocity.

Figure 11:
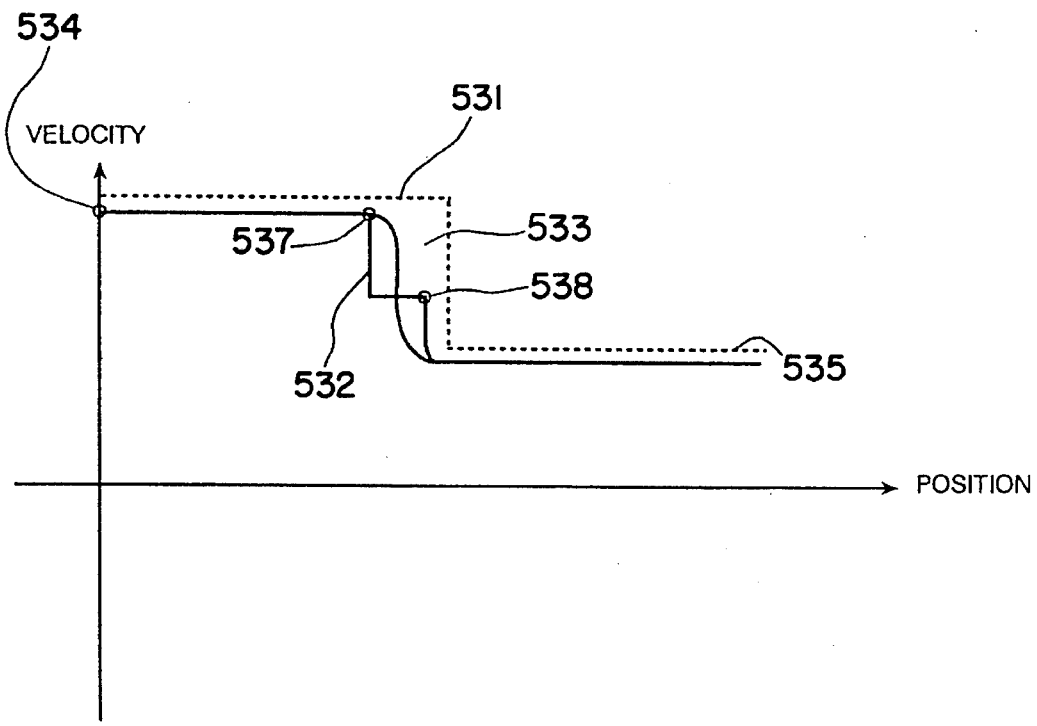
FIG. 11 is a drawing showing an example of a scheduled motion plan by the scheduled motion planning method of the present invention.

FIG. 11 shows the relationship of the velocity (the vertical axis) to the position (the horizontal axis). Since the velocity at the time of planning 534 is almost equal to an ideal velocity 531, an example that deceleration to the next ideal velocity 535 is planned is shown. In this case, the motion planner for vehicle 1 makes a plan related to intermediate desired velocity and two switching times 537, 538 by analyzing on the phase plane. A predicted velocity 533 is less than the ideal velocity even during transition of deceleration.

Figure 12:
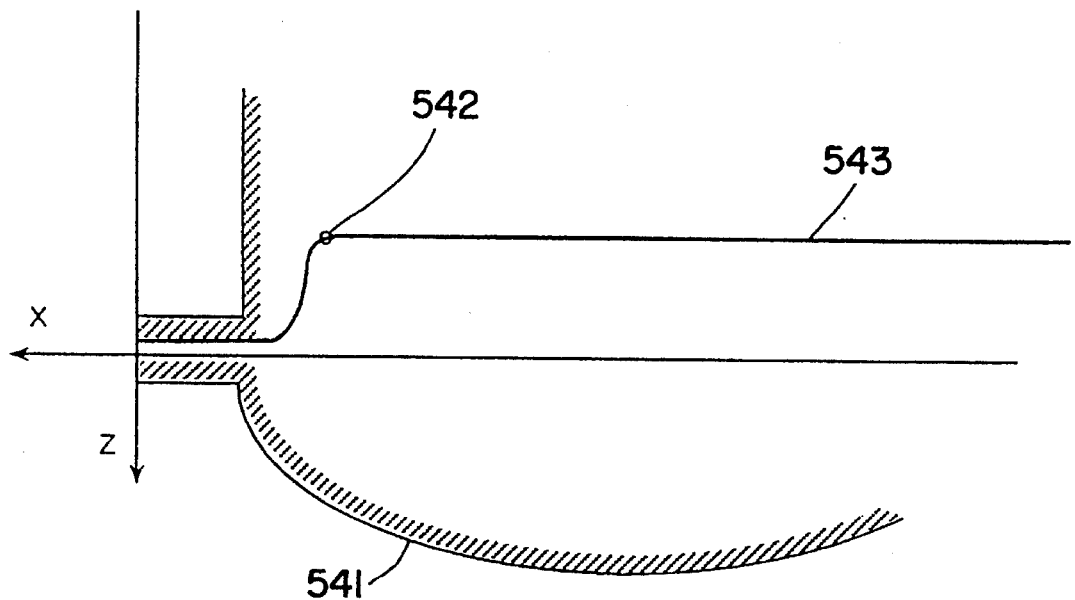
FIG. 12 is a drawing showing an example of a scheduled motion plan by the scheduled motion planning method of the present invention.

FIG. 12 shows the relationship between the x direction and z direction. An example that switching of the control mode when the position may pass an approach region 541 is planned is shown. In this case, the motion planner for vehicle 1 sets the switching timing 542 of the control mode that the width of the 0 region is smaller. A predicted trajectory 543 will not pass limit of the approach region 541.

Next, processing by the onboard simulator 2 will be explained.

The onboard simulator 2 contains a dynamics model and a guidance and control model. The dynamics model means the CW equation which is used as an orbit motion equation, mass of a space-craft, moment of inertia, structural data of a sensor or actuator, or disorder of the environment. The guidance and control model means guidance rules by linear interpolation and spline interpolation, control rules by phase plane control, or acceleration force performance by an actuator.

In simulation in the transition state, the onboard simulator 2 integrates states in the cycle of the controller. In simulation in the stationary state, the desired states can be calculated without integration. When the control model is phase plane control, there are two cases which enter the stationary state. They are the + binding region 515 (the position deviation is in the neighborhood of +a) and the − binding region 516 (the position deviation is in the neighborhood of −a) shown in FIG. 9. This is an intrinsic characteristic of the phase plane control.

For example, when the desired position at a certain time is −500 ft, and the desired velocity is 1 ft/s, and the locus is bound in the + binding region, 50 seconds later:

the desired position can be simply calculated to −450 ft, the desired velocity to 1 ft/s, the predicted position to about "−450 − a" ft, and the predicted velocity to about 1 ft/s.

Dynamics parameters of the dynamics model of the onboard simulator 2 may be changed whenever required, by a dynamics model identifying means which is separately installed.

The aforementioned embodiment obtains good results indicated below.

(a) When a mission goal is given so as to reach the final desired position at a certain time, the ideal velocity is set so as to reach the desired position at this time. Since it is planned so that the velocity can approach the ideal velocity as far as possible, the actual time may not be varied much from the predicted time and the number of adjustments of replan will be reduced.

(b) Since it is planned so that the velocity can approach the ideal velocity as far as possible, waste of fuel due to overshooting can be reduced.

(c) Since a plan until the mission goal is accomplished by using the onboard simulator can be made, even if a time lag from the predicted time is generated due to disorder or measurement errors, it is possible to reach the desired position at the predicted time by replan.

(d) The range for using the ideal velocity can be set flexibly, for example, by fuzzy inference.

(e) Since the binding state on the phase plane is analyzed in the stationary state, the state at an optional time can be grasped without the dynamics model being simulated. Therefore, the processing time of the onboard simulator which performs all the processing in the minimum integration cycle can be shortened substantially.

(f) Since the onboard simulator can contain a dynamics model, a dynamics model which is nonlinear may be used.

The present invention is effective in not only the aforementioned application examples to space-crafts but also vehicle guidance and control indicated below. A point in common with each other is that there are two or more objects, and one is a vehicle and the vehicle makes a plan for guidance & control.

Figure 13:
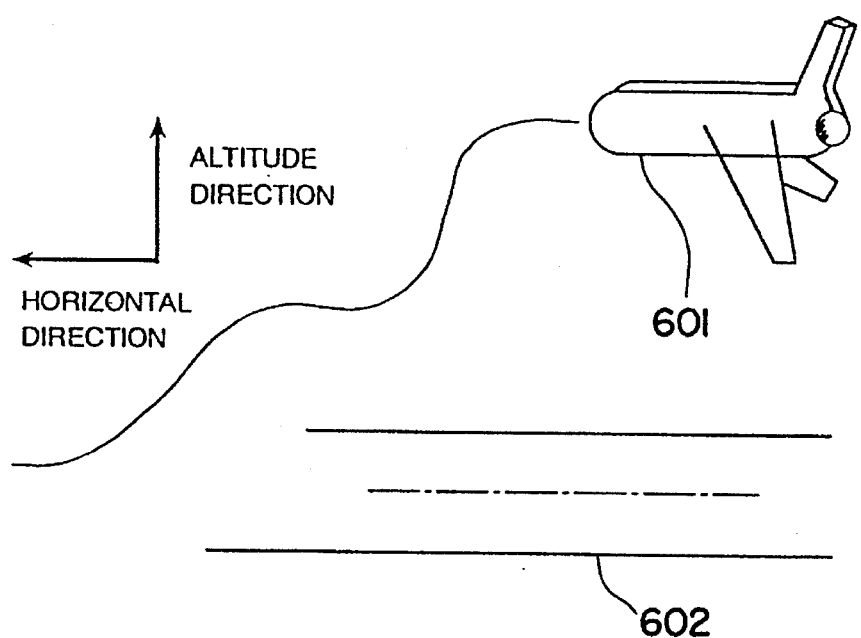
FIG. 13 is a drawing showing an application example of the present invention.

(I) Landing of an aircraft FIG. 13 is a schematic drawing of a landing aircraft and runway.

At the time of landing, by the reason of safety such as to avoid a collision with a runway 602 due to a steep dive of an aircraft 601, there are constraints in the velocity in the altitude direction, the velocity in the horizontal direction so as to prevent the flying stability from losing due to a stall, and the approach region to the runway. When the landing time onto the runway and the approach runway are given, the scheduled motion plan up to landing (particularly the desired velocity in the altitude direction and the desired velocity in the horizontal direction) is executed.

(II) Distribution

Figure 14:
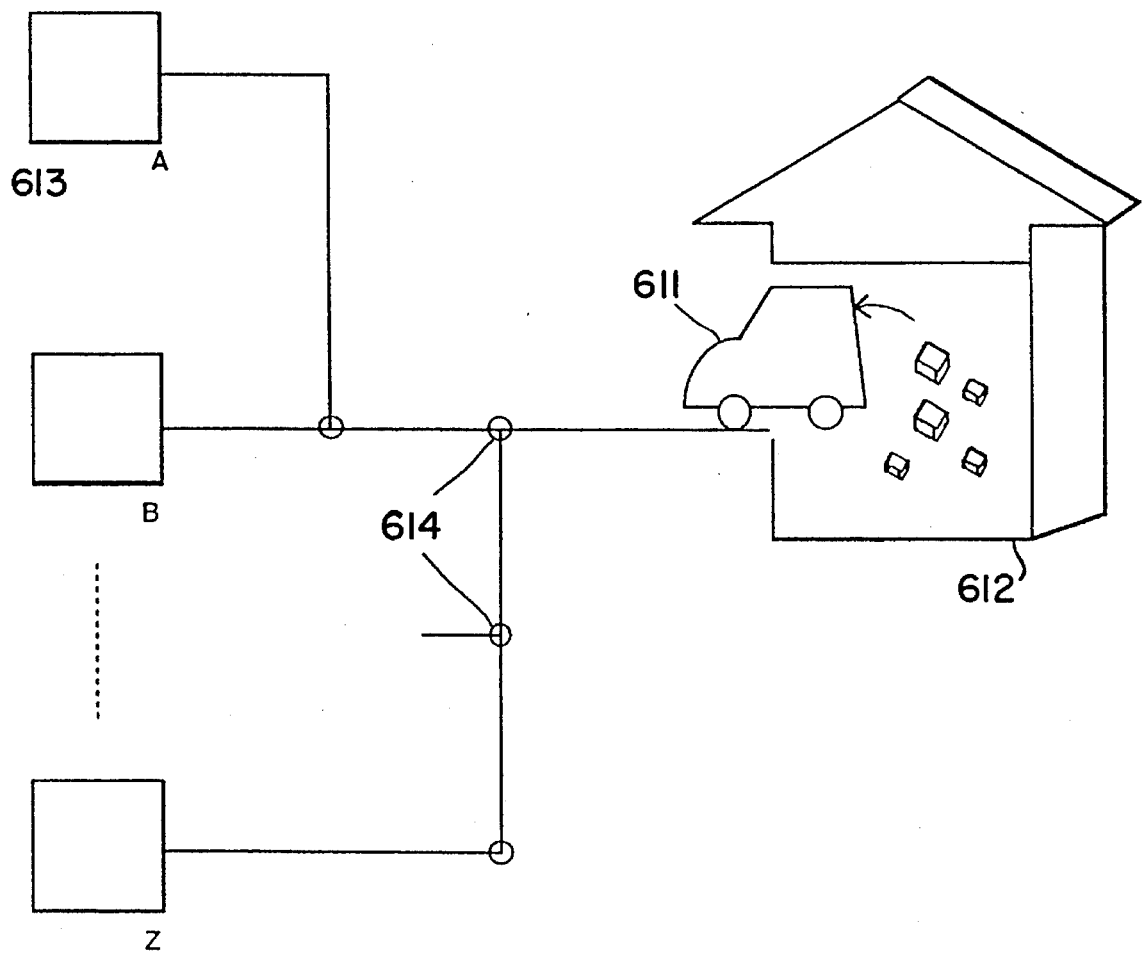
FIG. 14 is a drawing showing another application example of the present invention.

FIG. 14 is a schematic drawing of an unmanned carrier for carrying articles and a workshop for carrying in or out burdens.

A carrier 611 receives burdens at a carry-out workshop 612. When a desired carry-in workshop 613 and the arrival time to there are given, the carrier 611 executes the scheduled motion plan for the distribution path up to arrival at there and the desired velocity on the way. In this case, the carrier is decelerated or accelerated at a joint 614.

(III) Automatic follow-up of a car

Figure 15:
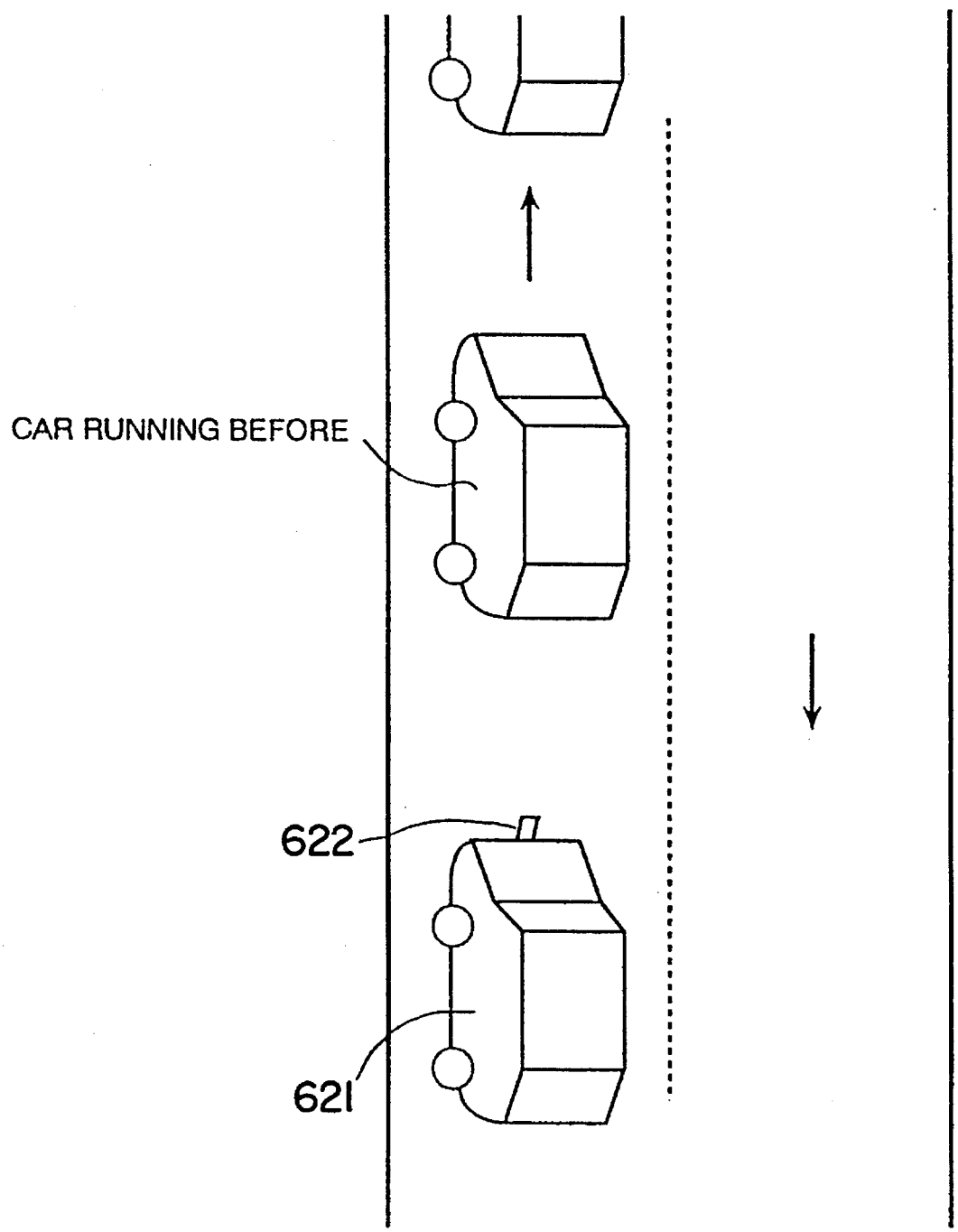
FIG. 15 is a drawing showing still another application example of the present invention.

FIG. 15 shows cars when an urban district is congested with traffic.

A car 621 is provided with a forward obstacle detecting sensor 622. The car is an automatic transmission car and can move forward or stop by adjusting the brake pressure without the accelerator being pressed. When the driver sets the congestion automatic driving mode at the time of congestion, the car can adjust the brake pressure automatically. When a car running before 623 moves to a fixed distance or more, the car 621 executes the scheduled motion plan and shortens the interval with the car running before again.

The present invention obtains good results indicated below.

(1) Since the onboard simulator contains a dynamics model and a guidance and control model, a scheduled motion plan in the transition state also can be made.

(2) Since the onboard simulator contains a dynamics model, a dynamics model which is nonlinear may be used.

(3) Since the onboard simulator contains a dynamics model and a guidance and control model, a scheduled motion plan up to accomplishment of the mission goal can be made.

(4) In the stationary state or in the binding state, the state at an optional time can be easily calculated on the basis of the state, so that the processing time of the onboard simulator can be shortened substantially.

(5) The range for using the ideal velocity can be set according to the evaluation items such as time, fuel cost, and safety.

(6) By comparing the ideal velocity to the position with the states from the navigator or the predicted states at a certain time which are calculated by the onboard simulator, the plan type at the time can be judged.

(7) Since it is planned so that the velocity can approach the ideal velocity as far as possible, the actual time may not be varied much from the predicted time and the number of adjustments of replan will be reduced.

(8) Since it is planned so that the velocity can approach the ideal velocity as far as possible, waste of fuel due to overshooting can be reduced.

(9) When the controller uses the phase plane control, the simulation analysis necessary for a scheduled motion plan for obtaining the good results shown in (7) and (8) can be performed easily on the phase plane.

What is claimed is:

1. A scheduled motion planning method for guidance and control of the vehicle according to the motion plan, comprising:

(1) a step of setting simulation conditions for simulating said motion;

(2) a step of performing simulation on the basis of the said simulation conditions and outputting the result;

(3) a step of evaluating said simulation result on the basis of predetermined constraints and demanded specifications; and (4) a step of making a scheduled motion plan for guidance and control of the vehicle on the basis of said evaluation result;

wherein said step of setting the simulation conditions in (1) includes:

(1-1) a step of obtaining the current position and velocity of the vehicle, constraints, and demanded specifications;

(1-2) a step of setting an ideal position and ideal velocity curve for satisfying said constraints and demanded specifications;

(1-3) a step of judging a plan type by comparing said ideal position and ideal velocity curve with said obtained position and velocity data or said simulation result; and (1-4) a step of setting simulation conditions for said plan type.

2. A scheduled motion planning apparatus for a vehicle having a sensor for measuring a signal for calculating the position and velocity of the vehicle, a navigator for calculating said position and velocity from the measured signal, an actuator for accelerating or decelerating the vehicle, a controller for giving control command to said actuator, and guidance means for giving a necessary desired position and velocity to said controller and guidance and control of the vehicle, comprising:

(1) means for obtaining the position, velocity data, and time of the vehicle from the navigator;

(2) means for obtaining constraints and demanded specifications;

(3) an onboard simulator for simulating the motion on the basis of a dynamic model and guidance and control model;

(4) simulation condition setting means for setting an ideal position and ideal velocity curve for satisfying said constraints and demanded specifications on the basis of said constraints and demanded specifications, and for judging a plan type by comparing the ideal position and ideal velocity curve with said obtained position and velocity data or comparing the ideal position and velocity curve with the simulation result by said onboard simulator, and for setting simulation conditions;

(5) means for evaluating said simulation result by the onboard simulator on the basis of predetermined constraints and demanded specifications; and motion planning means for making a motion plan on the basis of said evaluation by the onboard simulator.

3. A scheduled motion planning method for a vehicle according to claim 1, wherein when the velocity at a certain time is assumed as a stationary state, (2) said step for outputting the simulation result calculates the position and velocity data at an optional time without recursive integration by using the state at that time.

4. A scheduled motion planning method for a vehicle according to claim 1, wherein when the plan type is "acceleration up to an ideal velocity", (1) said step of setting simulation conditions sets simulation conditions so that an intermediate desired velocity which being at least the predicted peak velocity reaches the said ideal velocity and the timing for switching the intermediate desired velocity to the final desired velocity equal to said ideal velocity can be calculated as a simulation result.

5. A scheduled motion planning method for a vehicle according to claim 1, wherein when the plan type is "deceleration up to an ideal velocity," (1) said step of setting simulation conditions sets simulation conditions so that an intermediate desired velocity which being at least the predicted peak velocity reaches the said ideal velocity and the timing for switching the intermediate desired velocity to final desired velocity equal to said ideal velocity can be calculated as a simulation result.

6. A scheduled motion planning method for a vehicle according to claim 1, wherein when the plan type is "deceleration to the next ideal velocity," (1) said step of setting simulation conditions sets simulation conditions so that an intermediate desired velocity which being at least the predicted peak velocity reaches the said next ideal velocity, the timing for switching to the intermediate desired velocity and to the said next ideal velocity, and the time until the predicted velocity is bound to the said next ideal velocity can be calculated as a simulation result.

7. A scheduled motion planning method for a vehicle according to claim 1, wherein when the plan type is "deceleration to the next ideal velocity" and predicted velocity may not be undershot even if the desired velocity is switched to the said next ideal velocity directly, (1) said step of setting simulation conditions sets simulation conditions so that the time until the predicted velocity is bound to the said next ideal velocity can be calculated.

8. A scheduled motion planning method for a vehicle according to claim 1, wherein when the method for control of the vehicle uses phase plane control, (1) said step of setting simulation conditions sets simulation conditions for analyzing on a phase plane consisting of position deviation and velocity deviation.

9. A scheduled motion planning method for a vehicle according to claim 1, wherein when the method for control of the vehicle uses phase plane control, (1) said step of setting simulation conditions divides the phase plane into several characteristic regions on the basis of the dynamic model of the vehicle and sets simulation conditions on the basis of the above divided regions.

10. A scheduled motion planning method for a vehicle according to claim 1, wherein when the method for control of the vehicle uses phase plane control and the relationship between the position deviation and velocity deviation at a certain time is assumed to be in the binding region where the locus on the phase plane is bound in the neighborhood of a certain point, (2) said step for outputting the simulation result calculates the position and velocity data at an optional time without recursive calculation on the basis of the state at that time.

11. A scheduled motion planning method for a vehicle according to claim 1, wherein when the method for control of the vehicle uses phase plane control and the plan type is "acceleration up to an ideal velocity," (1) said step of setting simulation conditions sets simulation conditions so that an intermediate desired velocity which being at least the predicted peak velocity reaches the said ideal velocity and the timing that the relationship between the position deviation and velocity deviation immediately after the intermediate desired velocity is switched to another desired velocity equal to said ideal velocity reaches the (+) binding region where the locus on the (+) side on the phase plane is binding to a certain point can be calculated as a simulation result.

12. A scheduled motion planning method for a vehicle according to claim 1, wherein when the method for control of the vehicle uses phase plane control and the plan type is "deceleration down to an ideal velocity," (1) said step of setting simulation conditions sets simulation conditions so that an intermediate desired velocity which being at least the predicted peak velocity reaches the said ideal velocity and the timing that the relationship between the position deviation and velocity deviation immediately after the intermediate desired velocity is switched to another desired velocity equal to said ideal velocity reaches the (−) binding region on the (−) side on the phase plane can be calculated as a simulation result.

13. A scheduled motion planning method for a vehicle according to claim 1, wherein when the method for control of the vehicle uses phase plane control and the plan type is "deceleration down to the next ideal velocity," (1) said step of setting simulation conditions sets simulation conditions so that an intermediate desired velocity which being at least the predicted peak velocity reaches the said ideal velocity, the timing that the relationship between the position deviation and velocity deviation immediately after the intermediate desired velocity is switched to another desired velocity equal to said ideal velocity reaches the (−) binding region on the (−) side on the phase plane, and the time until the velocity binds to the next ideal velocity can be calculated as a simulation result.

14. A scheduled motion planning method for a vehicle according to claim 1, wherein when the method for control of the vehicle uses phase plane control and the velocity deviation and position deviation on the basis of said velocity may not enter the undershoot region on the phase plane even if the desired velocity is switched to the said next ideal velocity directly, (1) said step of setting simulation conditions sets simulation conditions so that the time until the predicted velocity is bound to the next ideal velocity can be calculated.

15. A scheduled motion planning method for a vehicle according to claim 1, wherein when the method for control of the vehicle uses phase plane control and it is predicted that the positional constraints of the vehicle cannot be satisfied by the simulation result, (1) said step of setting simulation conditions sets simulation conditions so that the phase plane control parameter is changed while the positional constraints of the vehicle are satisfied.

16. A scheduled motion planning method for a vehicle according to claim 1, wherein when the method for control of the vehicle uses phase plane control and the phase plane control parameter is changed, (4) said step of making a scheduled motion plan makes a scheduled motion plan such that the desired position is switched to the position which is obtained when it is changed at the same time.

* * * * *